Feb. 1, 1944.      D. O. MILLER      2,340,549
COMPOSITE DRIVE SHAFT
Filed April 12, 1943

Inventor
Dale O. Miller
By Liverance & Van Antwerp
Attorneys.

Patented Feb. 1, 1944

2,340,549

UNITED STATES PATENT OFFICE 2,340,549

COMPOSITE DRIVE SHAFT

Dale O. Miller, Detroit, Mich.

Application April 12, 1943, Serial No. 482,666

3 Claims. (Cl. 287—52)

This invention relates to a composite drive shaft, previously generally made of a single material, such as a bronze alloy and containing gearing of a desired character thereon.

In the present invention a composite shaft is provided which includes a central shaft core preferably of steel or similar material, around which is cast a manganese aluminum bronze member which, in the embodiment of the invention which I have produced, is a worm gearing generally known either as a worm or a tangent for engagement with a driving worm wheel.

A purpose of the present invention is to make a shaft of this character with increased or added strength over the previous solid single material shafts. A further object and purpose of the invention is to reduce in amount the bronze alloy used substituting for a part thereof a less critical material, such as steel. This is accomplished not only without sacrifice of strength but with an increase in strength, and with no sacrifice in the better characteristics which the bronze alloy has when used in gearing over various other materials.

Figure 1:
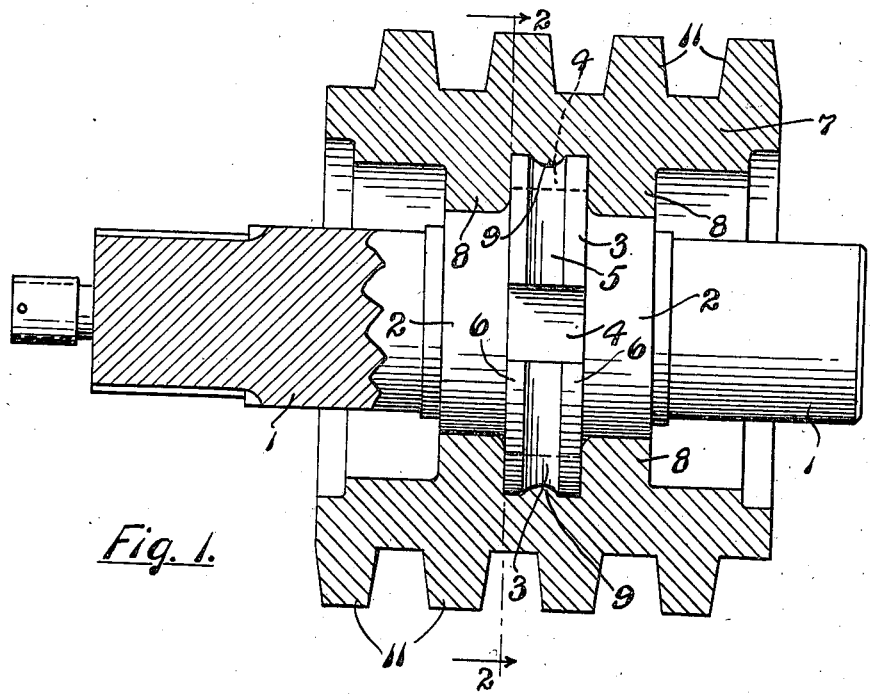

An understanding of the invention may be had from the following description taken in connection with the accompanying drawing, in which, Fig. 1 is a longitudinal section through the composite drive shaft of my invention.

Figure 2:
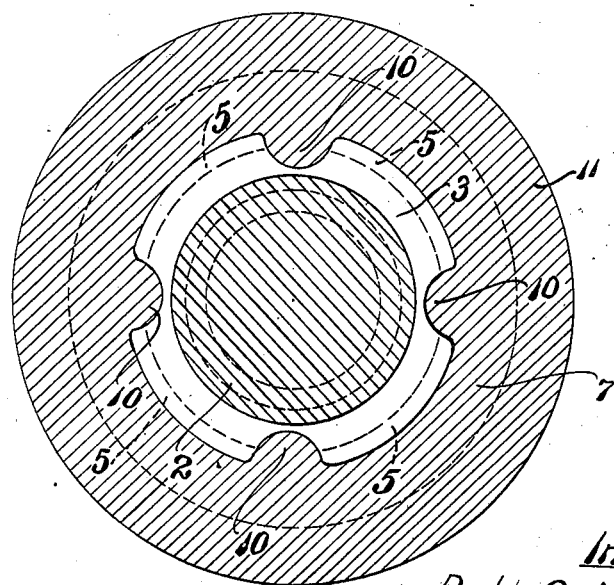

Fig. 2 is a transverse section substantially on the plane of line 2—2 of Fig. 1 looking in the direction indicated.

Like reference characters refer to like parts in the figures of the drawing.

The central shaft or core, preferably of steel, includes two spaced sections 1 of the same diameter between and integral with which is a hub which includes two spaced apart cylindrical sections 2, somewhat larger in diameter than the sections 1, and between and integral with which is a disk generally indicated at 3 of a still larger diameter, as shown. This part 3 in the form of a relatively thick disk, at spaced apart intervals around it, is provided with inwardly extending recesses 4 which while shown as of substantially semi-cylindrical outline may, of course, take many other forms. Such recesses preferably are equally spaced from each other and while shown as four in number may have the number varied without departing from the invention.

A peripheral groove 5 is formed around the disk substantially midway between its sides, the groove being in sections extending from one recess 4 to the other. At each side of the groove, peripherally of the disk 3, are annular ledges 6 as shown.

This steel shaft core may be cast and without machining and with no further treatment than cleaning the outer surfaces have the member 7 of manganese aluminum bronze cast therearound, as of the construction best shown in Fig. 1. Inwardly extending relatively thick annular projecting ribs 8 are cast against the sections 2 of the hub and against the opposite sides of the disk 3 which project radially beyond said sections 2. The grooves 5 will be filled with the bronze alloy material, as at 9, and the transverse recesses 4 will likewise be filled with inward projections 10 providing a very secure and strong interlock of the manganese aluminum bronze member 7 with the hub of the core consisting of the disk 3 and the hub sections 2, one at each side thereof. The solidifying and cooling of the molten bronze alloy with the resultant shrinkage which comes therefrom causes the bronze material to press tightly against all of the surfaces of the steel core member with which it engages.

The worm around the outer surface of the sleeve-like bronze member 7 is indicated at 11. It is of course understood that various other kinds of gearing besides worm gearing may be provided at the outer portions of the outer member 7 of the composite structure without affecting the invention.

The grooves at 5 around the disk 3 are intended to give a resistance against shear in a lengthwise direction and add resistance to any shearing strain which may occur to what is provided by the ribs 8. The inward projections 10 seated in the recesses 4 provide a positive lock between the outer sleeve 7 of bronze alloy and the inner steel core preventing any possibility of a tendency of one part to rotate relative to the other. The form and shape of this hub with the preferred semi-circular form and shape of the recesses 4 are to give proportional strength to the outside bronze worm member and in the transmission of force or strain from one member to the other with all chances of slipping and the parts becoming loose reduced to a minimum and in fact wholly eliminated.

The construction described has proven very practical and useful getting a better gearing than previously provided and one having greater strength and with a marked conservation of the critical bronze alloy material.

The invention is defined in the appended claims and is to be considered comprehensive of all forms of structure coming within their scope.

I claim:

1. In a structure of the class described, a core shaft of a selected metallic material having a hub between its ends, said hub including an annular radially projecting disk between the ends of the hub, said disk having spaced transverse recesses in its peripheral portions, and an outer member of a different metallic material cast over said hub and embracing said disk at its sides and around its periphery and having interlocking portions extending into said recesses of the disk, as specified.

2. A construction containing the elements in combination defined in claim 1, said disk around its periphery between the transverse recesses therein having grooves formed between the opposite sides of the disk and extending from one transverse recess to the other, complementary ribs from the outer member when cast filling the grooves.

3. In a construction of the class described, a shaft core of steel having thereon between its ends a hub including a circular disk having spaced transverse recesses therein at the outer portions of the disk, and the hub further comprising cylindrical sections greater in diameter than the diameter of the shaft and of less diameter than the diameter of the disk integral with and extending one in each direction away from the disk, and a sleeve of bronze alloy cast upon the hub and embracing said disk and provided with inwardly extending annular ribs bearing against said oppositely disposed hub sections extending from the disk, said sleeve having inwardly extending portions filling the transverse recesses in said disk, the outer surface of said sleeve being adapted to have gearing thereon integral with the sleeve.

DALE O. MILLER.